United States Patent
Haas

[15] 3,656,936
[45] Apr. 18, 1972

[54] VANADIUM RECOVERY PROCESS

[72] Inventor: Frank C. Haas, Arvada, Colo.
[73] Assignee: The Oil Shale Corporation, New York, N.Y.
[22] Filed: Oct. 14, 1970
[21] Appl. No.: 80,778

[52] U.S. Cl. ...........................75/101 R, 75/101 BE, 75/121, 75/84, 75/108, 23/18, 23/19 V, 23/24
[51] Int. Cl. .........................................................C22b 55/00
[58] Field of Search .................75/121, 108, 101 R, 101 BE, 75/84; 23/18, 19 V, 24, 23

[56] References Cited

UNITED STATES PATENTS

| | | | |
|---|---|---|---|
| 828,850 | 8/1906 | Haynes | 23/18 |
| 1,554,917 | 9/1925 | Kunkle | 23/19 V |
| 1,577,411 | 3/1926 | Thews | 23/19 V |
| 1,674,806 | 6/1928 | Stokes | 23/19 V |
| 2,257,978 | 10/1941 | Robertson et al. | 23/18 |
| 2,270,444 | 1/1942 | Jenness | 23/17 |
| 2,937,074 | 5/1960 | Abrams | 23/19 |
| 3,376,105 | 4/1968 | Naumann | 23/22 |
| 3,429,693 | 2/1969 | Bauer et al. | 75/101 R |

*Primary Examiner*—L. Dewayne Rutledge
*Assistant Examiner*—G. T. Ozaki
*Attorney*—Brumbaugh, Graves, Donohue & Raymond

[57] ABSTRACT

A process is provided for recovering vanadium values from highly alkaline, calcium-rich calcines, which are usually the roasted product of low-grade vanadium-bearing calcitic ores. The process involves slurrying the calcine in water and carbonating the slurry to a pH of 5.0 to 9.0 to extract the soluble vanadium species from the slurry. A basic anion exchange resin is added to the carbonated slurry thereby increasing the vanadium recovery by shifting the extraction equilibrium.

8 Claims, No Drawings

3,656,936

VANADIUM RECOVERY PROCESS

The present invention relates to a process for the recovery of vanadium values from vanadium-bearing ores and other vanadium-bearing materials which contain significant quantities of calcium minerals, and which may also desirably contain carbonaceous and/or hydrocarbonaceous substances. The process if particularly useful in processing low-grade vanadium-bearing calcitic ores which, otherwise, could not be processed economically by any of the well-known prior art methods.

For quite sometime, vanadium-bearing ores have been roasted with a fluxing or transposing agent which reacts to form soluble vanadium compounds. The most common fluxing reagents include salt and/or soda ash. The roasted calcines are leached with water and the vanadium compounds recovered from the leach liquor by precipitation techniques. Other widely used vanadium recovery schemes involve direct acid or soda ash leaching of vanadium ores. Regardless of the prior art procedure selected, high calcium concentrations in the ore result either in the formation upon roasting of insoluble vanadates or excessive reagent consumption during the leach operation. Usually, such processes are restricted, economically, to ores containing less than 5 percent lime, whereas the present invention may advantageously recover vanadium values from ores containing substantially greater amounts. Indeed, additional amounts of calcium compounds which form free lime upon roasting may be incorporated to actually increase the yield of vanadium beyond that heretofore possible.

Various additional approaches have been suggested for coping with calcium-rich, vanadium-bearing ores. One such approach to the problem of forming insoluble calcium vanadate compounds when calcium is present as free lime is to neutralize the excess lime. As in the more common prior art processes, the suggested solution was to limit the amount of available calcium so as to yield water soluble calcium vanadates in lieu of insoluble forms by reacting the excess calcium with an oxidized form of sulfur and thereafter quenching the calcine in water. Obviously, this process likewise requires a reagent which, if not present in the ore as mined, must be added as an additional operating expense.

The process of the present invention is particularly useful for recovering low-grade vanadium values from ores which contain relatively large amounts of lime-producing calcium compounds as well as organic compounds. The calcium compounds of lime, calcite, dolomite and the like may be present in varying amounts of up to 75 weight percent and more of the roast mixture. The organic compounds include the gambit of carbonaceous and hydrocarbonaceous substances, and particularly the kerogen present in oil shale. The process is also applicable to calcium-deficient low-grade vanadium ores to which calcium compounds may be added to yield calcines which, upon roasting and slurrying, are highly alkaline. A calcium-deficient ore is one which contains little or no lime-producing compounds.

It has now been found that the water insoluble vanadium compounds which result from the roasting or ores, synthetic mixtures, and similar compositions containing lime or some other calcium precursor can be successfully leached and recovered without the use of extraneous reagents as heretofore required. In accordance with the present invention, the calcium-rich vanadium-bearing materials are roasted at a temperature from about 600° to about 1,100° C to convert the vanadium precursor to a species that is water insoluble at the highly alkaline conditions of the calcine. The calcine is thereafter slurried in water at a solids content of from 2 to 50 percent. The slurry invariably has a pH above about 12.0. The insoluble vanadates are then solubilized and leached by introducing carbon dioxide into the slurry in amount sufficient to lower the pH to between about 5.0 and 9.0. The carbon dioxide addition also advantageously serves to precipitate calcium carbonate which may be desirably recycled to the roast operation. The vanadium species may then be recovered by conventional precipitation and solvent extraction techniques.

While the solvent extraction and precipitation techniques yield varying amounts of vanadium, it has been found that vanadium recoveries may be significantly improved by shifting the extraction equilibrium. The improved recovery is obtained by admixing a strong basic anion exchange resin with the slurry. In a continuous process, it is desirable to maintain the pH of the slurry within the desired range through the constant addition of carbon dioxide thereto. The carbonation step may be carried out prior to or concurrent with the addition of resin to the slurry. As the soluble vanadium anions are adsorbed by the resin, the concurrent introduction of carbon dioxide maintains the desired pH to effect additional vanadium extraction. The adsorbed vanadium is thereafter stripped from the resin and recovered by conventional techniques.

In the roasting operation, the calcium and organic compounds are converted to lime, carbon dioxide and other decomposition products. The carbon dioxide resulting from the decomposition of calcite and/or combustion of organic carbon may be recovered and thereafter used to treat the aqueous alkaline slurries as previously described. The roasting operation is conducted at temperatures in the order of 600° to 1,100° C to convert the vanadium compounds into their water insoluble species. The vanadium species formed in this manner are not readily identifiable. However, it is known that the particular species which is water insoluble at pH's of above about 10 is water soluble at pH's between about 5.0 and 9.0 with the best recoveries being obtained at pH's between about 5.0 and 7.0. pH values below about 6.0 are obtained by using pressure leach techniques. These lower pH values are difficult to measure accurately because as the pressure is released by opening the vessel, carbon dioxide is evolved thereby raising the pH.

It is generally known that the roasting of ores containing calcium and vanadium compounds in an oxidizing atmosphere at temperatures up to 1,000° C yields insoluble vanadium compounds when quenched in water and therefore forms no part of the present invention. However, it has been found that the recovery of vanadium values from calcium-rich vanadium-bearing ores can sometimes be enhanced by conducting the roast operation in an oxygen deficient atmosphere. While the improved recovery has been found to be generally applicable to the processing of ores containing virtually no organic carbon, the explanation thereof is not understood or readily apparent. In the processing of such ores, carbonaceous substances, such as coal, coke and the like, may be added to the roast mixture prior to calcination to provide and insure the oxygen-deficient atmosphere during the roast operation. The majority of ores processed according to the present invention usually contain some organic carbon. This is particularly true of oil shales and other carbonaceous shales which typically contain 2 to 10 percent fixed organic carbon. As to these shales, it has been found necessary to remove as much of the carbon as possible by roasting. If the carbon is not removed, the amount of vanadium recovered suffers drastically. Consequently, the roasting time is important only in that substantially all of the carbon is removed.

Although the physical roasting operation is not critical, it is desirable to utilize relatively short residence time roasting methods. Specifically, both dilute phase and dense phase fluid beds have been used successfully to burn and remove the fixed carbon. Dilute phase fluid beds are preferred because they involve residence times in the order of a minute or less, whereas dense phase fluidized beds require roasting times of 3 to 5 minutes and more. Of course, the direct fired rotary kiln may in some instances be completely satisfactory, in which event the roasting time will be in the order of 10 to 60 minutes. Regardless of the roasting method chosen, it is desirable to utilize the carbon dioxide contained in the process waste gases. This may be done by contacting the waste flue gas stream from the roasting operation with the slurry or by passing the stream through a liquid-gas contactor to absorb the carbon dioxide therefrom.

The roasted calcine may be slurried in water by any convenient technique. Slurry formation may be accomplished by introducing the hot calcine while still at about 600° C directly into water, thereby quenching the calcine. While this procedure is preferred, the calcine may also be cooled, crushed and slurried at much lower temperatures. The solids concentration of the slurry may vary from 2 to 50 percent, and, preferably, from 15 to 40 percent.

The initial pH of the slurry prior to the addition of carbon dioxide is usually above about 13. Carbon dioxide is added to lower the pH to between about pH 5.0 and 9.0, although the optimum recoveries have been obtained at pH's between about 6.0 and 7.5 and at a solids content of about 20 percent. The addition of carbon dioxide to the slurry not only solubilizes the vanadium, it also reacts with the lime to precipitate calcium carbonate. The amount of carbon dioxide required is ideally that amount which is formed during calcite decomposition and returned to the slurry to convert the lime back to calcite. The vanadium extraction usually requires from about 5 to 60 minutes at leach temperatures from about 25° to 80° C.

As previously pointed out, the yield of vanadium values may be significantly increased by incorporating a basic anion exchange resin in the slurry (resin-in-pulp technique) during the extraction step. Carbon dioxide may also be advantageously added to the slurry to maintain the desired pH value. Through the use of anion exchange resins, it is feasible to adsorb up to 99 percent of the extractable vanadium for overall yields from the liquid phase in the order of at least 70 percent. Optimum vanadium extraction is accomplished through the use of multiple adsorption and elution stages.

Among the suitable anion exchange resins are the strong base quaternary amine anion exchange resins. Some of the resins found to be useful for recovering vanadium values from the pulp are the resins marketed under the trade names "Amberlite IRA-400," Amberlite IRA-425," and "Dowex-21K." Amberlite IRA-400 and Amberlite IRA-425 are strongly basic anion exchange resins containing a quarternary ammonium group prepared by reacting a tertiary amine with a chloromethylated copolymer of styrene and divinylbenzene as described in U.S. Pat. No. 2,591,573. These two resins are the same except that IRA-425 is specifically made for resin-in-pulp processes. Dowex-21K is a strong base quarternary amine resin manufactured from a copolymer of styrene and divinylbenzene which has been cholormethylated and then aminated with trimethylamine. The Dowex-21K resin is also specifically made for resin-in-pulp operations. Additional resin characteristics may be found in the manufacturers' literature (Rohm & Haas for Amberlite resins and Dow Chemical for Dowex resins).

After the various resins have adsorbed the optimum amount of vanadium values, the loaded resin is screened from the slurry and the vanadium removed from the resin by contacting the resin with a suitable eluting solution. Aqueous eluting solutions of sodium chloride, sodium chloride and ammonium chloride, sodium hydroxide, and sulfurous acid may be used to strip the resin. The most practical eluting solutions are sodium chloride or sodium chloride and ammonium chloride wherein the concentration of sodium chloride is in the order of 20 percent by volume. The most satisfactory elution temperature is about 50° to 70° C. The vanadium is thereafter recovered in its oxide form by precipitating it as ammonium metavanadate and then roasting the precipitate to form $V_2O_5$. It should be pointed out that one major advantage of the instant process is that chemical costs are limited to the ammonium chloride requirement used in this step for precipitating ammonium metavanadate.

Various embodiments of the process of the invention will be further illustrated by the representative examples set forth below.

EXAMPLE 1

This example demonstrates the effect of pH range on the amount of vanadium extracted.

Portions of a composite sample containing 1.07 percent vanadium pentoxide were roasted at 600° C in a muffle furnace for 1 hour and quenched in water. The slurries thus formed had a pH of about 13. Carbon dioxide was added to the slurries to adjust the pH to between 7.0 and 12.5. The carbonated slurries were mixed with various forms of a strong anion base exchange resin (Amberlite IRA-400) and leached for about 15 minutes at ambient temperature to load the resins with vanadium ions. Atmospheric pressure was used in all but one of the tests. The resins were thereafter stripped of the vanadium ions and the vanadium precipitated. The results of aqueous leaching at various pH's are presented in the following Table I.

TABLE I

| Test No. | % Solids | Pressure p.s.i.g. | pH | Resin Form | % $V_2O_5$ Extracted |
| --- | --- | --- | --- | --- | --- |
| S-553 | 40 | Ambient | 7 | $HSO_4^-$ | 50 |
| S-555 | 40 | 65 | 7 | $HSO_4^-$ | 55 |
| S-556 | 40 | Ambient | 7 | $OH^-$ | 50 |
| S-557 | 40 | Ambient | 7 | $Cl^-$ | 53 |
| S-558 | 40 | Ambient | 8.9 | $Cl^-$ | 54 |
| 70-31B | 25 | Ambient | 10 | $Cl^-$ | 4 |
| 70-31A | 25 | Ambient | 11 | $Cl^-$ | 0 |
| S-561 | 25 | Ambient | 12.5 | $Cl^-$ | 1 |
| S-560 | 25 | Ambient | 7 | $Cl^-$ | 53 |
| S-565 | 25 | Ambient | 7 | $HCO_3^-$ | 55 |

From the data in the above Table I, it can be seen that vanadium extraction decreases sharply at pH's above 9.0. It also is apparent that the use of pressure during the leach operation aids in increasing vanadium extraction and that virtually any form of the resin may be used.

EXAMPLE 2

This example illustrates the equilibrium shift caused by adding a basic anion exchange resin to the slurry which results in increased vanadium extraction. Two synthetically prepared samples and two samples of vanadium-bearing shale ash serve to illustrate the effect of resin addition.

The synthetic sample was prepared by blending 50 grams of calcium carbonate with 0.75 grams of vanadium pentoxide and roasting the mixture at 1,000° C for 1 hours. The vanadium-bearing shale was also roasted at 1,000° C for 1 hours. The calcines were quenched in water to form aqueous alkaline slurries having a solids content of about 25 percent. A strong basic anion exchange resin (Amberlite IRA-425) was added to two slurries containing the synthetically prepared sample and the shale ash sample, respectively. Carbon dioxide was then introduced into all four slurries to lower the pH from about 13.0 to about 6.5 to 7.0 and then leached for about 15 minutes at ambient conditions. The resins were thereafter screened from the slurries and stripped of the vanadium values. The liquor from the two slurries, which did not contain the resin, was analyzed for the percent $V_2O_5$ extracted. The results of the four tests are presented in the following Table II.

TABLE II

| Sample Type | Resin in Slurry | % $V_2O_5$ Extracted |
| --- | --- | --- |
| Synthetic Blend | No | 66 |
| Synthetic Blend | Yes | 88 |
| Shale Ash | No | 5 |
| Shale Ash | Yes | 55 |

From the data in the above Table II, it is evident that the equilibrium shift resulting from the addition of a basic anion exchange resin results in the recovery of a substantially greater portion of the vanadium values present in the calcined material and partially solubilized in the aqueous carbonated slurry.

EXAMPLE 3

This example shows the effect of varying roasting temperatures and times upon the solubility of a synthetically prepared blend of calcium carbonate and vanadium pentoxide that is slurried in water and leached with carbon dioxide.

The same was prepared by blending reagent grade calcium carbonate and vanadium pentoxide in the ratio of 100:1 and roasting portions of the mixture at various temperatures for different time periods. The roasted calcines where then slurried in water at a solids content of about 25 percent. The slurries were carbonated by adding carbon dioxide until the slurry pH was reduced from about 13.0 to about 6.5 to 7.0. This also precipitated calcium carbonate. The slurries containing the water soluble calcium vanadate species and calcium carbonate solids were leached for 15 minutes. The solids were filtered and the solution analyzed for the percent of vanadium pentoxide extracted. For all but three of the tests, an oxidizing atmosphere was maintained during the roasting operation.

The percent of vanadium pentoxide ($V_2O_5$) extracted as a function of roasting time, temperature and atmosphere is presented in the following Table III.

TABLE III

| Test No. | Temp. °C. | Time Min. | Air Addition | % $V_2O_5$ Extraction |
|---|---|---|---|---|
| 1 | 600 | 5 | Yes | 26 |
| 2 | 600 | 15 | Yes | 27 |
| 3 | 600 | 30 | Yes | 22 |
| 4 | 600 | 60 | Yes | 20 |
| 5 | 800 | 5 | Yes | 37 |
| 6 | 800 | 15 | Yes | 52 |
| 7 | 800 | 30 | Yes | 11 |
| 8 | 800 | 60 | Yes | 15 |
| 9 | 1000 | 5 | Yes | 13 |
| 10 | 1000 | 15 | Yes | 15 |
| 11 | 1000 | 30 | Yes | 15 |
| 12 | 1000 | 60 | Yes | 44 |
| 13 | 600 | 5 | No | 44 |
| 14 | 600 | 15 | No | 33 |
| 15 | 600 | 30 | No | 35 |

From the above data in Table III, it is readily apparent that the optimum condition is 800° C in an oxidizing atmosphere for 15 minutes. It is also apparent that the absence of air is also beneficial since very good extractions are attainable at temperatures as low as 600° C.

EXAMPLE 4

This example illustrates the effect of varying roasting temperatures, times and atmosphere on the vanadium solubility of ores containing residual carbon and calcite with respect to the recovery of vanadium from oil shale which has not been previously retorted to convert the kerogen to oil.

Portions of a composite sample of raw carbonaceous shale (designated Composite No. 3) containing 16 percent organic carbon and 50 percent calcite were roasted in a muffle furnace at various temperatures for different time periods, with and without the addition of air to the furnace. The hot calcines were quenched in water to form slurries containing about 20 percent solids. The slurries were carbonated by adding carbon dioxide for about 15 minutes to lower the pH to about 6.5 to 7.0 and thereafter mixed with a basic anion exchange resin (Amberlite IRA-425) to load the resin with vanadium ions. The resin loading operation is accomplished by stirring the resin into the slurry. Carbonation continued during the loading operation so as to maintain the desired pH. The loaded resin was then contacted with a stripping solution containing 20 percent sodium chloride to transfer the vanadium ions to the stripping solution. Ammonium chloride was added to precipitate ammonium metavanadate from the stripping solution. The results, which illustrate the effect of varying roasting time, temperature, atmosphere, and organic carbon in the residue on the amount of vanadium extracted (measured in terms of percent $V_2O_5$ extracted), are set forth in the following Table IV.

TABLE IV

| Temp. °C. | Time Hr. | Air to Muffle Roast | % Extraction | Residue % Organic Carbon |
|---|---|---|---|---|
| 600 | ½ | Yes | 14 | 0.34 |
|  | 1 | Yes | 42 | 0.08 |
| 650 | ½ | Yes | 28 | 0.02 |
|  | 1 | Yes | 30 | 0.22 |
| 700 | ½ | Yes | 50 | 0.41 |
|  | 1 | Yes | 48 | 1.08 |
| 750 | ½ | Yes | 48 | * |
|  | 1 | Yes | 40 | * |
| 800 | ¼ | Yes | 10 | * |
|  | ½ | Yes | 43 | 0.02 |
|  | ½ | Yes | 57 | * |
|  | 1 | No | 12 | * |
|  | 1 | Yes | 50 | * |
|  | 1 | Yes | 58 | * |
| 850 | ½ | No | 3 | 1.35 |
|  | ¼ | Yes | 3 | * |
|  | ½ | Yes | 47 | * |
|  | ½ | Yes | 43 | * |
|  | 1 | No | 30 | 0.26 |
|  | 1 | Yes | 41 | * |
|  | 1 | Yes | 48 | * |
| 900 | ½ | Yes | 42 | 0.07 |
|  | 1 | Yes | 52 | 0.16 |
| 950 | ½ | No | 31 | 1.65 |
|  | ½ | Yes | 44 | 0.27 |
|  | 1 | No | 46 | 0.08 |
|  | 1 | Yes | 41 | * |
| 1000 | ½ | No | 55 | 0.12 |
|  | ½ | Yes | 49 | * |
|  | 1 | No | 55 | 0.01 |
|  | 1 | Yes | 46 | * |

* Not analyzed for organic carbon.

From the above data in Table IV, it is readily apparent that about 50 percent of the vanadium was extracted over a temperature range of 700° to 1,000° C regardless of the roasting atmosphere, provided, however, that substantially all of the carbon is burned off during the roasting operation. It can be seen that when roasting is conducted in the absence of air, the amount of organic carbon remaining in the calcine greatly affects the vanadium extraction.

EXAMPLE 5

This example illustrates the effect of various roasting temperatures, time periods and organic carbon content of the roasted calcine on the amount of vanadium recovered from spent shale. Spent shale is the residue remaining after pyrolysis of raw oil shale to remove the kerogen. Spent shale usually contains about 2 to 10 percent fixed organic carbon depending on its place of origin.

Portions of a composite sample of spent shale (designated Composite No. 7) were roasted in a muffle furnace in the presence of air at various temperatures and periods of time. The calcines were quenched in water to form slurries containing about 20 solids. The slurries were then carbonated with carbon dioxide to adjust the pH from about 13.0 to about 6.5 to 7.0, and an anion exchange resin (Dowex-21K) was added to the slurry to load the resin with vanadium ions. The loaded resin was decanted by screening and subsequently stripped of the vanadium ions with a 20 percent sodium chloride solution. The vanadium was precipitated through the addition of ammonium chloride. The results, which illustrate the effect of organic carbon content, are set forth in the following Table V.

TABLE V

| Roast Temp. °C. | Roast Time Min. | % V₂O₅ Extraction | Residue, % Organic Carbon |
| --- | --- | --- | --- |
| 600 | 5 | 13 | 4.57 |
|  | 15 | 2 | 3.31 |
|  | 30 | 33 | 1.24 |
|  | 60 | 42 | 0.32 |
| 650 | 5 | 17 | 3.89 |
|  | 15 | 8 | * |
|  | 30 | 33 | 0.63 |
|  | 60 | 42 | <0.1 |
| 700 | 5 | 18 | 3.76 |
|  | 15 | 0 | 1.51 |
|  | 30 | 39 | <0.1 |
|  | 60 | 42 | <0.1 |
| 750 | 5 | 14 | 2.82 |
|  | 15 | 0 | 1.43 |
|  | 30 | 44 | 0.15 |
|  | 60 | 49 | <0.1 |
| 800 | 5 | 8 | 5.08 |
|  | 15 | 10 | 1.75 |
|  | 30 | 57 | <0.1 |
|  | 60 | 58 | <0.1 |
| 850 | 5 | 18 | 2.63 |
|  | 15 | 3 | * |
|  | 30 | 43 | <0.1 |
|  | 60 | 48 | * |
| 900 | 5 | 18 | 2.22 |
|  | 15 | 9 | <0.1 |
|  | 30 | 30 | <0.1 |
|  | 60 | 33 | <0.1 |
| 950 | 5 | 4 | 2.17 |
|  | 15 | 9 | <0.1 |
|  | 30 | 32 | <0.1 |
|  | 60 | 37 | <0.1 |
| 1000 | 5 | 12 | 1.75 |
|  | 15 | 8 | <0.1 |
|  | 30 | 35 | * |
|  | 60 | 21 | * |

* Not analyzed for organic carbon.

From the data set forth in the above Table V, like that presented in Table IV, it is evident that V₂O₅ yields of up to 58 percent are attained when substantially all of the carbon is removed. The optimum roast condition for muffle furnace roasted spent shale is about 800° C for 30 to 60 minutes followed by water quench.

EXAMPLE 6

This example illustrates the effect of adding calcite to the vanadium-bearing, calcite-deficient ore upon the extraction of vanadium values.

A sample, which analyzed 0.46 percent V₂O₅ and contained no carbonaceous or carbonate minerals, was admixed with varying amounts of calcite, i.e. calcium carbonate, to determine the effect of carbonate addition to the recovery of vanadium values. Portions of the sample were roasted in an oxidizing atmosphere for 60 minutes at 800° C and 1,000° C. The hot calcines were quenched in water to form highly alkaline slurries (pH ≈ 13) having a solids content of about 20 percent. The slurries were carbonated to adjust the pH to about 7.0. The slurries were then admixed with an anion exchange resin (Amberlite IRA–425) to form a pulp from which the vanadium was extracted. The pH was maintained at about 5.0 to 9.0 through the continuous introduction of carbon dioxide. As in the previous example, the loaded resin was decanted by screening and stripped with a 20 percent solution of sodium chloride of its vanadium values. Ammonium metavanadate was precipitated with the addition of ammonium chloride. The results of calcite addition, prior to the roasting operation, are set forth in Table VI.

TABLE VI

| CaCO₃ Added | Roast Temp., °C. | Roast Time, Min. | % V₂O₅ Extraction |
| --- | --- | --- | --- |
| 0 | 800 | 60 | 19 |
| 2 | 800 | 60 | 23 |
| 4 | 800 | 60 | 23 |
| 50 | 800 | 60 | 32 |
| 50 | 1000 | 60 | 36 |
| 25 | 800 | 30 | 20 |
| 25 | 1000 | 5 | 17 |
| 25 | 1000 | 15 | 32 |
| 25 | 1000 | 30 | 42 |

The data set forth in the above Table VI indicate that the addition of calcite to a vanadium-bearing matrix, which originally was devoid of carbonaceous matter and carbonate minerals, significantly improves vanadium extraction. It is also apparent that vanadium extraction can be increased somewhat through the use of higher roasting temperatures and/or larger calcite additions.

EXAMPLE 7

This example demonstrates the vanadium extraction efficiency to be independent of pulp density (the weight percent solids in the leach liquor) and physical roasting methods.

Fifteen samples of vanadium-bearing retorted spent shale were roasted in an oxidizing atmosphere at temperatures varying from 600° to 1,000° C to remove substantially all of the residual organic carbon. The samples assayed from 10 to 50 percent calcite. The physical roasting procedure was carried out in a muffle furnace, a dense phase fluid bed and a dilute phase fluid bed to provide a wide range of roasting conditions. The muffle furnace provided about 1 hour residence time. The dilute and dense phase fluid beds provided residence times in the order of 15 seconds and 5 minutes, respectively. After the various calcines were quenched in water at varying pulp densities, the pH of each slurry was adjusted to pH 7.0 through the addition of carbon dioxide. There after, a strong basic anion exchange resin (Amberlite IRA–400) was admixed with the slurry to load the resin with vanadium ions. The leach operation was carried out for about 15 minutes. The loaded resin was then screened from the slurry and stripped of the vanadium values. The vanadium extraction in percent vanadium pentoxide is reported in the following Table VII.

TABLE VII

| Roast method | Roast temp. (° C.) | Ash source | Percent Solids of leach | Percent V₂O₅ extraction |
| --- | --- | --- | --- | --- |
| Muffle furnace | 600 | Comp 1–12 #4 | 30 | 55 |
| Do | 600 | BB1000 Series | 25 | 51 |
| Do | 600 | Comp 1–12 #4A | 40 | 51 |
| Do | 600 | Comp 1–12 #2 | 40 | 48 |
| Do | 600 | Comp 1–12 #3 | 10 | 46 |
| Do | 600 | Comp 1–12 #3 | 20 | 51 |
| Do | 600 | Comp 1–12 #3 | 20 | 50 |
| Do | 600 | Hole T-19 | 20 | 34 |
| Do | 600 | Hole T-20 | 20 | 32 |
| Do | 1,000 | Comp 1–12 #3 | 40 | 15 |
| Dilute phase fluid bed | 1,000 | BB1000 Series | 10 | 36 |
| Do | 780 | ....do.... | 30 | 51 |
| Do | 900 | ....do.... | 20 | 31 |
| Do | 780 | S–564 | 25 | 50 |
| Dense phase fluid bed | 790 | BB1000 Series | 20 | 37 |
| Do | 780 | S–562 | 25 | 52 |
| Do | 776 | S–563 | 25 | 56 |

The data set forth in the above Table VII indicate that vanadium recovery is independent of pulp density which varied from about 10 to 40 percent. The data also indicate that the physical roast procedure may be as slow or as rapid as is desirable, depending upon the equipment available.

EXAMPLE 8

This example illustrates the effect of roasting in an oxygen-deficient atmosphere on the formation of water soluble vanadium compounds.

Portions of a composite sample of vanadium-bearing outcrop shale containing virtually no organic carbon were prepared by admixing raw coal therewith in varying amounts. The sample assayed 0.56 percent vanadium pentoxide. Each portion was roasted in a muffle furnace for 60 minutes. The roasting temperatures were varied from 600° to 1,100° C while maintaining an oxygen-deficient atmosphere by not allowing air to enter the furnace. The calcines were quenched in water to form slurries having a solids content of about 20 percent. Carbon dioxide was then added to the slurries to reduce the pH from about 13.0 to about 6.5 to 7.5. The carbonated slurries were mixed with an anion exchange resin (Dowex–21K) and leached for 15 minutes at 60° C to load the resin with vanadium ions, which were subsequently stripped from the resin and precipitated. The stripping solution contained 20 percent sodium chloride. The vanadium is precipitated as ammonium metavanadate which crystallized out in the presence of excess ammonium chloride. The ammonium metavanadate is then calcined to vanadium pentoxide, $V_2O_5$. The vanadium extractions, expressed in percent vanadium pentoxide of the head sample, are set forth in the following Table VIII.

TABLE VIII

| Sample No. | Roast Temp., °C. | % Raw Coal Added | % $V_2O_5$ Extracted |
|---|---|---|---|
| Base | 700 | 0 | 23.3 |
| 669 | 700 | 10 | 28.6 |
| 670 | 700 | 20 | 24.1 |
| 666 | 800 | 5 | 41.4 |
| 664 | 800 | 10 | 35.8 |
| 667 | 800 | 20 | 42.9 |
| 671 | 900 | 5 | 48.9 |
| 672 | 900 | 10 | 54.0 |
| 673 | 900 | 20 | 68.7 |
| 691 | 1100 | 20 | 70.5 |

From the above data in Table VIII, it is evident that the addition of coal prior to roasting yielded a non-oxidizing atmosphere upon roasting and resulted in a substantial increase in the amount of recoverable vanadium. Vanadium recoveries were increased threefold by increasing roasting temperature.

What is claimed is:

1. A process for recovery of vanadium values from a calcine of a vanadium-bearing calcium-rich matrix which comprises the steps of
   a. introducing said calcine into water to form a highly alkaline aqueous slurry having a pH above about 13;
   b. introducing carbon dioxide into said slurry to adjust the pH thereof to between about pH 5 to about pH 9 so as to solubilize the vanadium values and precipitate calcium carbonate; and
   c. recovering the soluble vanadium values.

2. The process as defined in claim 1 comprising the further step of admixing a basic anion exchange resin with the aqueous slurry formed according to step (b) to extract additional solubilized vanadium values from the slurry.

3. The process as defined in claim 2 wherein the pH of said slurry of step (b) is maintained between about pH 5 and about pH 7 during the extraction so as to solubilize and extract additional vanadium values.

4. The process as defined in claim 1 comprising the further step prior to step (a) of adding about 5 to about 75 percent by weight calcium carbonate to the vanadium-bearing calcium-rich matrix prior to the calcination thereof.

5. The process as defined in claim 1 wherein said slurry of step (a) is maintained at a solids content between about 2 percent and 50 percent by weight.

6. The process as defined in claim 1 comprising the further step prior to step (a) of roasting the vanadium-bearing, calcium-rich matrix in an oxygen-deficient atmosphere at a temperature from about 600° to about 1,000° C to form said calcine.

7. The process as defined in claim 6 wherein a carbonaceous substance is admixed with said matrix prior to calcination thereof.

8. A process for the recovery of vanadium values from a carbonaceous vanadium-bearing, calcium carbonate-rich ore which comprises the steps of
   a. roasting said ore in an oxygen-deficient atmosphere at a temperature from about 600° to about 1,100° C. to provide a vanadium-bearing calcium-rich calcine and carbon dioxide off-gas;
   b. quenching said calcine in water to form a highly alkaline aqueous slurry having a pH above about 13 and a solids content between about 15 percent and 40 percent by weight;
   c. recovering and introducing said carbon dioxide off-gas into said slurry to adjust the pH thereof to between about pH 5 and about pH 7 so as to solubilize the vanadium values and precipitate calcium carbonate;
   d. admixing a basic anion exchange resin with the slurry to extract soluble vanadium values from the slurry while maintaining said pH of between about pH 5 and about pH 7 during the extraction so as to solubilize and extract additional vanadium values; and
   e. recovering the vanadium values from said resin.

* * * * *

PO-1050
(5/69)

UNITED STATES PATENT OFFICE
CERTIFICATE OF CORRECTION

Patent No. 3,656,936　　　　　　　Dated April 18, 1972

Inventor(s) FRANK C. HAAS

It is certified that error appears in the above-identified patent and that said Letters Patent are hereby corrected as shown below:

Column 1, line 58, "or ores" should be --of ores--.
Column 3, line 55, "sodium chloride and ammonium" should be --sodium chloride-ammonium--; line 58, "sodium chloride and ammonium chloride" should be --sodium chloride-ammonium chloride--. Column 4, line 47, "hours" should be --hour--; line 48, "hours" should be --hour--. Column 5, line 64, "in water" should be --with water--. Column 6, line 67, "20 solids" should be --20% solids--. Column 8, line 1, column 1 heading, "$CaCO_3$" should be --%$CaCO_3$--. Column 10, line 10, "and about" should be --to about--; line 45, "and about" should be --to about--.

Signed and sealed this 5th day of December 1972.

(SEAL)
Attest:

EDWARD M.FLETCHER,JR.　　　　　　　　　　ROBERT GOTTSCHALK
Attesting Officer　　　　　　　　　　　　Commissioner of Patents